United States Patent [19]

Bilofsky et al.

[11] 4,415,648

[45] Nov. 15, 1983

[54] VARIABLE DENSITY PHOTOGRAPHIC TRANSPARENCIES

[75] Inventors: Ruth C. Bilofsky; Ronald A. Sahatjian, both of Lexington, Mass.

[73] Assignee: Polaroid Corporation, Cambridge, Mass.

[21] Appl. No.: 234,687

[22] Filed: Feb. 17, 1981

[51] Int. Cl.[3] .............................................. G03B 27/76

[52] U.S. Cl. ..................................... 430/220; 430/229

[58] Field of Search ............... 430/229, 220, 227, 228; 250/223

[56] References Cited

U.S. PATENT DOCUMENTS

| | | | |
|---|---|---|---|
| 3,351,466 | 11/1967 | Land | 430/229 |
| 3,362,819 | 1/1968 | Land | 430/216 |
| 3,362,821 | 1/1968 | Land | 430/216 |
| 3,649,100 | 3/1972 | Kirst | 350/147 |
| 3,738,741 | 6/1973 | Fournie | 353/20 |
| 3,926,520 | 12/1975 | Kaufman | 250/225 |

*Primary Examiner*—John E. Kittle
*Assistant Examiner*—John L. Goodrow
*Attorney, Agent, or Firm*—Louis G. Xiarhos

[57] ABSTRACT

Photographic transparency assemblies comprising a photographic image supported on a transparent sheet material associated with a light polarizer element. The transparency assembly, including the light polarizer element, can be viewed in conjunction with a second partially crossed light polarizer element in order to modify the transmission density of the transparency image.

2 Claims, 3 Drawing Figures

VARIABLE DENSITY PHOTOGRAPHIC TRANSPARENCIES

In general, photographic images traditionally have been classified as either reflection prints or transparencies. A reflection print ordinarily consists of a photographic image supported on a substantially opaque, light reflecting sheet and is adapted for viewing by reflected light. On the other hand, a transparency ordinarily consists of a photographic image supported on a substantially transparent sheet and is adapted to be viewed by transmitted light, i.e. light transmitted through the areas of the transparency as a function of the photographic image.

Transparencies commonly may be viewed using projection devices incorporating either a direct projection scheme, such as a light box arrangement, or an indirect projection scheme, such as an overhead projection arrangement. However, to obtain optimum viewing image quality, a transparency image must be specifically designed for the particular projection device with which it is to be viewed. Transparencies are not readily interchangeable between different types of projection devices without noticeable variations in image characteristics, such as color saturation, tone, contrast or clarity.

The transmission density of transparency images designed for viewing by overhead projection generally is lower than corresponding transparency images designed for light box viewing. When an overhead transparency is viewed using a light box arrangement, the tones or colors of the image appear duller in comparison with those of the same image when viewed using an overhead projector.

Now, according to the present invention, a photographic transparency is provided which can be used interchangeably with either direct or indirect projection viewing devices. The transparency assembly comprises a photographic image supported on a transparent sheet associated with a light polarizer element. Through use of a second light polarizer, the transmission density of the transparency assembly may be increased to any desired degree simply by adjusting the second polarizer to be out of parallel alignment with the first polarizer. By selectively crossing the two polarizers to reduce the amount of transmitted light, a lower density transparency assembly suitable for viewing by overhead projection can also be conveniently viewed on a light box.

The transparency image may be produced by any photographic technique; the manner of associating a polarizing element with the transparency also is not critical. However, a convenient and preferred embodiment of the present invention is to form a photographic transparency assembly which includes a light polarizer element as an integral part of its supporting structure. A particularly preferred type of transparency image is one produced by diffusion transfer techniques. For purposes of illustration of the present invention, an embodiment having a color transparency assembly incorporating a diffusion transfer image-receiving element will be described in further detail below.

Diffusion transfer photographic products and processes have been described in numerous patents, including, for example, U.S. Pat. Nos. 2,983,606; 3,345,163; 3,362,819; 3,415,644; 3,573,043; and 3,594,165. In general, diffusion transfer photographic products and processes involve film units having a photosensitive system including at least one silver halide layer, usually integrated with an image-providing material, e.g., an image dye-providing material. After photoexposure, the photosensitive system is developed, generally by uniformly distributing an aqueous alkaline processing composition over the photoexposed element, to establish an imagewise distribution of a diffusible image-providing material. The image-providing material is selectively transferred, at least in part, by diffusion to an image-receiving layer or element positioned in a superposed relationship with the developed photosensitive element and comprising at least a dyeable stratum capable of receiving the imagewise distribution of image dye-providing material with formation of the desired transfer image.

Various formats have been utilized for the provision of color diffusion transfer images including the so-called "integral negative-positive" film units and so-called "peel-apart" formats. In accordance with the integral negative-positive film units, the image-receiving layer or element containing the photographic image for viewing can remain permanently attached and integral with the photosensitive or image-generating system or layers and the image is viewed through a transparent support against a suitable reflecting background. Such integral negative-positive formats are described, for example, in the aforementioned U.S. Pat. Nos. 3,415,644; 3,573,043; and 3,594,165. Other, so-called "peel-apart," formats for color diffusion film units or assemblages are described, for example, in the aforementioned U.S. Pat. Nos. 2,983,606 and 3,345,163 and involve the separation of the image-receiving element from the photosensitive element after development and transfer of the dyes to the image-receiving layer. The image is viewed, after separation of the elements, as a reflection print where an opaque support for the image-receiving layer is utilized or as a transparency image where a transparent support material is employed.

Image-receiving elements suited to the provision of color reflection prints or transparencies, by separation from the photosensitive system after development and dye transfer, will generally comprise a suitable transparent support and a dye image-receiving layer and may have thereon a neutralizing or acid-reacting layer for control of the environmental pH of the diffusion transfer process, and a timing or spacer layer in conjunction with the neutralizing layer to control the initiation and rate of capture of alkali by the neutralizing or acid-reacting layer. Such image-receiving elements and further details concerning their use in diffusion transfer film units or assemblages can be found in U.S. Pat. Nos. 2,983,606; 3,362,819 and 3,362,821.

In an alternative embodiment, the neutralizing or acid-reacting layer and the timing or spacer layer may be positioned within the photosensitive system of the film unit. Such configurations are further describer, for example, in U.S. Pat. Nos. 3,573,043, issued Mar. 30, 1970 and 3,362,821, issued Jan. 9, 1968, both to E. H. Land. With this arrangement, image-receiving elements suited to provision of color reflection prints or transparencies, by separation from the photosensitive system after development and dye transfer will generally comprise a suitable support and a dye image-receiving layer.

Pursuant to the present invention, the image-receiving element of the diffusion transfer film unit incorporates a light polarizer layer. A favorable location for such a polarizer is adjacent the transparent support opposite the side of the support on which the image-receiving layer is carried. In this position, the polarizer will in no way interfere with the photographic processes of the film unit and, in turn, will be effectively shielded by the support material from such processes to obviate any adverse effects on the polarizer element.

The invention may be further understood by reference to the figures, in which.

Figure 1:
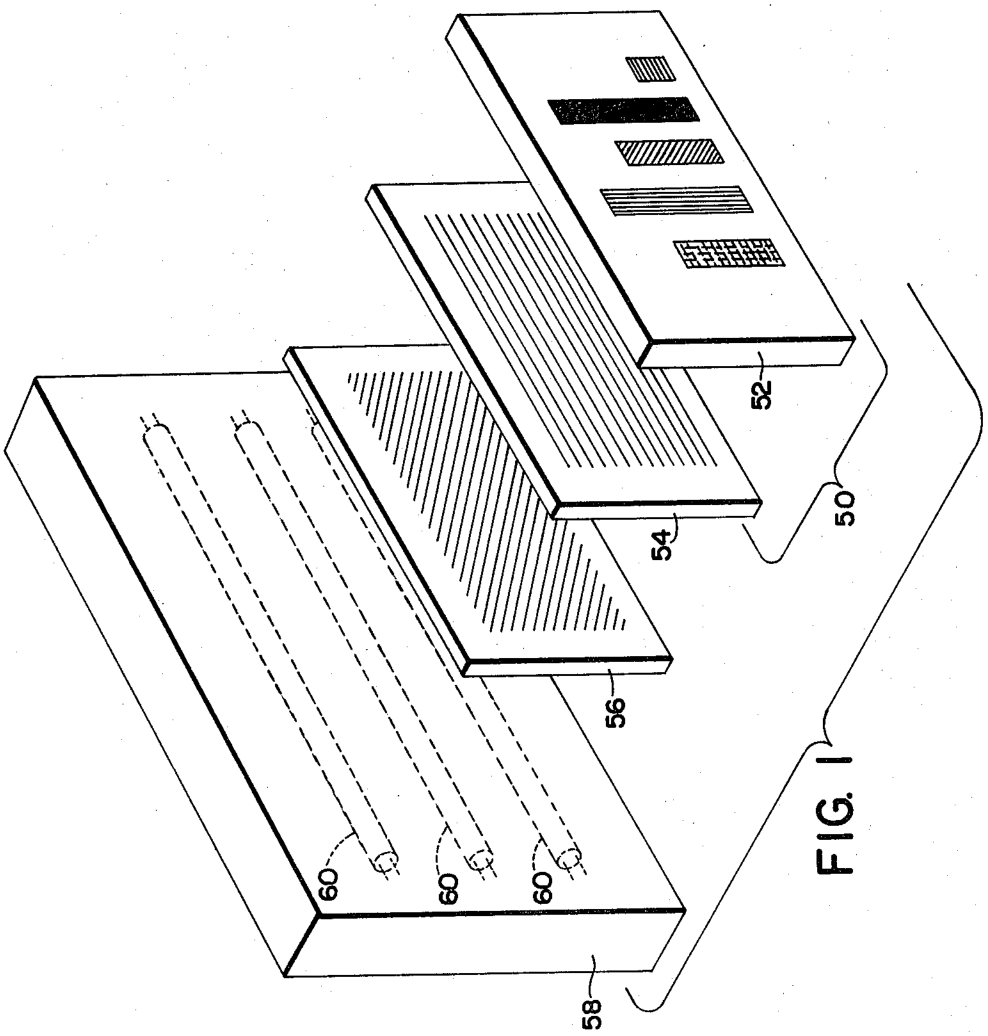
FIG. 1 is an exploded, perspective view of a transparency viewing arrangement including a light box viewing apparatus, a light polarizing element, and a transparency assembly according to the present invention incorporating a light polarizing element.

As illustrated in FIG. 1, a preferred transparency assembly 50 comprises an image-bearing transparency element 52 and a light polarizer element 54, which preferably forms an integral part of the image-bearing element. According to the present invention, to accommodate viewing on an overhead projection device, transparency element 52 may be prepared having images with a transmission density low enough to provide optimum viewability on such an indirect projection device. The presence of the single polarizer element 54 will exercise little effect in reducing image brightness in overhead projection viewing. However, in viewing the same transparency using a device such as a light box, the transmission density of the transparency image may be too low to provide the most desirable saturation and tone. To accommodate interchangeability of the transparency for viewing either on an overhead projector or on a light box arrangement, a second polarizer element 56 is provided for positioning between transparency assembly 50 and a light box viewing device 58. The light box 58 typically consists of a bank of lights, depicted as fluorescent light tubes 60, set behind a light diffusing translucent panel. By setting polarizer 56 in an orientation partially crossed to that of polarizer element 54, the light intensity of the viewing device, light box 58, can be reduced to any desired degree so as to compensate for the lower transmission density of the transparency image and accomplish an image of desirable color depth and/or tonal characteristics.

The polarizer elements 54 and 56 may be comprised of any of a variety of materials which produce the desired light polarization effects. A preferred polarizer material, and the most widely used type of synthetic polarizer, is the polyvinyl alcohol-iodide complex polarizer. It consists of a unidirectionally stretched, linearly oriented polyvinyl alcohol sheet, supported on a suitable transparent, isotropic plastic material, such as cellulose acetate butyrate, and stained with a polyiodide solution. Such polarizers are commercially available from Polaroid Corporation as Type H polarizer sheet. Suitable polarizing materials are further described in U.S. Pat. Nos. 2,174,304; 2,255,940; 2,306,108; 2,397,231; 2,445,555; 2,453,186 and 2,674,159.

Figure 2:
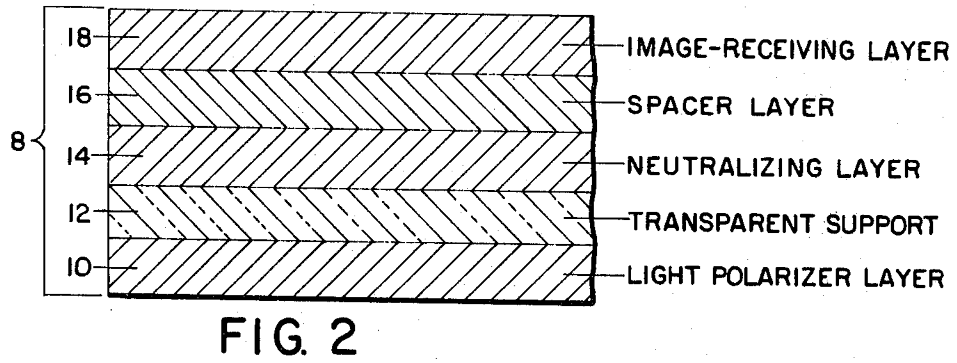
FIG. 2 is a diagrammatic cross-sectional view of a preferred transparency assembly of the present invention comprising a diffusion transfer image-receiving element incorporating a light polarizer layer.

FIG. 2 depicts a preferred transparency assembly 8 which comprises a diffusion transfer image-receiving element including an integral light polarizer layer 10. The polarizer layer is positioned adjacent transparent support member 12 which carries, in turn, a polymeric acid neutralizing layer 14, a time modulating or spacer layer 16 and an image-receiving layer 18.

Support material 12 can comprise any of a variety of transparent support materials. Typically, support material 12 will comprise a support onto which the remaining layers of image-receiving element 10 can be suitably applied and will include glass or polymeric support materials derived from naturally occuring products or of a synthetic type. Thus, methyl and ethyl esters of polymethacrylic acid; vinyl chloride polymers; polyvinyl acetal; polyamides such as nylon; polyesters such as ethylene glycol terephthalate or such cellulosic derivatives as cellulose acetate, triacetate, nitrate, propionate, butyrate, acetate-propionate or acetate-butyrate can be suitably employed. A preferred support material is a transparent web or sheet material such as polyethylene glycol terephthalate.

The support material can, where desired, be subjected to a pretreatment step prior to the application of neutralizing layer 14, spacer layer 16 and image-receiving layer 18. Such pretreatment step can be employed to facilitate adhesion between the polymeric acid layer and the support material and can comprise, for example, a corona discharge treatment as is known in the art. Polymeric layers, of vinylidene chloride, gelatin, polyvinyl alcohol or the like can also be utilized as subcoats onto which the remaining layers of article 8 can be suitably deposited.

The utilization and function of neutralizing layer 14 in an image-receiving element for control of pH within a diffusion transfer process is known and described, for example, in U.S. Pat. Nos. 3,362,819; 3,577,237 and 3,756,815. In general, neutralizing layer 14 provides an important function in controlling environmental pH within a diffusion transfer process and in promoting image stability. The neutralizing layer, which preferably comprises a polymeric acid material having non-diffusible acid groups, acts to capture alkali ions thereby reducing the pH or alkalinity of the surface of the image-receiving layer. This reduction in pH is timed to begin after the image dyes have been transferred to the image-receiving element and is at least partially completed prior to exposure of the image layer to air. As a result, the alkalinity or pH of the image dye environment in the image-receiving layer may be controlled and adjusted to a level advantageous for image stability.

The neutralizing layer preferably includes nondiffusible acid groups, for example, acid groups attached to a polymer so as to be nondiffusible. This method of pH reduction in effect, washes the image layer by internally diffusing the alkali ions and salt-forming reagents out of the image layer and into the neutralizing layer where they are precipitated. The neutralizing layer, thus, may be considered to be a mordant for alkali. In practice, a layer containing an acid-reacting polymer and, particularly, a polymer containing free carboxyl groups is provided in the image-receiving element and is positioned adjacent the support 12. A preferred acid-reacting polymeric material suited for application as neutralizing layer 14 is a partial butyl ester of an ethylene/maleic anhydride copolymer. Other acid-reacting neutralizing layer materials are, however, known and can be suitably employed. Examples of suitable acid-reacting reagents for the formation of neutralizing layer 14 are set forth, for example, in U.S. Pat. No. 3,362,819, incorporated by reference.

A spacer or time modulating layer 16 may be and is preferably disposed between the polymeric acid layer 14 and the image-receiving layer 18 in order to control the pH reduction so that it is not premature and hence will not interfere with the development process, e.g., to "time" control the pH reduction. Suitable spacer or "timer" layers for this purpose are described with particularity in U.S. Pat. No. 3,362,819 and in others, including U.S. Pat. Nos. 3,419,389; 3,421,893; 3,433,633; 3,455,686; 3,575,701, 3,785,815 and 3,856,522.

It will be understood that the neutralizing layer and time modulating layer alternatively may be positioned in the photosensitive element, or in each of the photosensitive and image-receiving elements, as described, for example, in U.S. Pat. No. 3,362,821.

The image-receiving layer 18 generally comprises a dyeable material which is permeable to the alkaline processing composition. The dyeable material may comprise polyvinyl alcohol together with a polyvinyl pyridine polymer such as a poly-4-vinyl pyridine polymer. Such image-receiving layers are further described in U.S. Pat. No. 3,148,061 issued to Howard C. Haas. A preferred image-receiving layer material comprises a graft copolymer of 4-vinylpyridine, vinylbenzyl-trimethylammonium chloride grafted on hydroxyethyl cellulose. Such graft copolymers and their use as image-receiving layers are further described in U.S. Pat. Nos. 3,756,814 and 4,080,346 issued to Stanley F. Bedell.

Image-receiving element 8 can be effectively utilized in a diffusion transfer process as described in the aforesaid U.S. Pat. No. 2,983,606 (issued May 9, 1961 to H. G. Rogers). As disclosed in said patent, a photographic element comprising at least one silver halide emulsion is exposed and subsequently developed in the presence of a dye developer, e.g., a compound which is both a dye and a silver halide developing agent, to impart to an image-receiving layer a reversed or positive dye image of the developed image by permeating into the emulsion, in superposed relationship with an appropriate image-receiving layer, a suitable liquid processing composition.

Preferably, the dye developer is contained initially as a layer in the photosensitive element, although it may be present in the liquid processing composition. The liquid processing composition permeates the emulsion to provide a solution of dye developer substantially uniformly distributed therein. As the exposed silver halide emulsion is developed, oxidized dye developer is immobilized or precipitated in developed areas, thereby providing an imagewise distribution of unoxidized dye developer dissolved in the liquid processing composition as a function of the point-to-point degree of exposure of the photographic element. At least part of this imagewise distribution of unoxidized dye developer is transferred by imbibition, to the superposed image-receiving layer. This image-receiving layer receives a depth-wise diffusion from the emulsion of unoxidized dye developer without appreciably disturbing the imagewise distribution thereof. The image-receiving element hereof can be utilized in diffusion transfer photographic products and is especially suited to the provision of color images by diffusion transfer processes employing dye developers as the color-providing materials. This aspect of the invention will be more fully understood by reference to FIG. 3 of the accompanying drawing.

Figure 3:
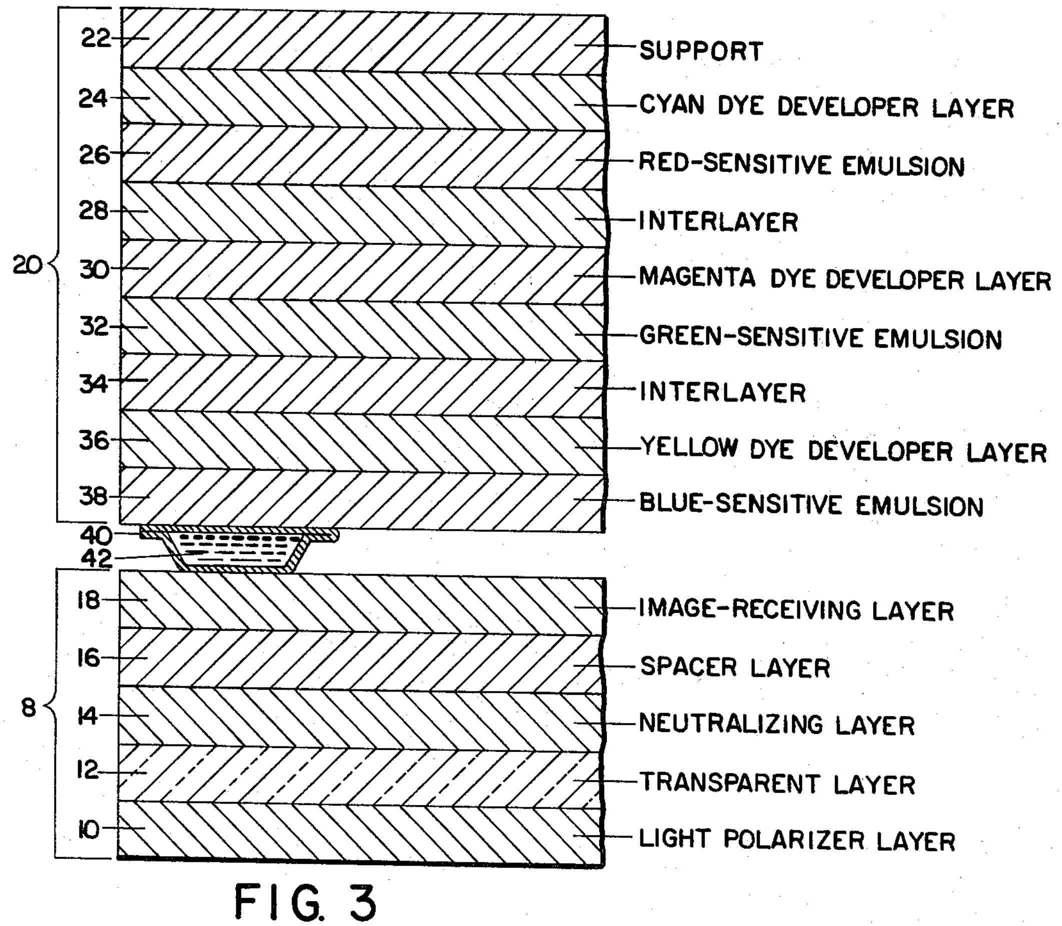
FIG. 3 is a diagrammatic cross-sectional view of a diffusion transfer film unit comprising a photosensitive element in association with a rupturable container holding a processing composition and an image-receiving element including a light polarizer layer, as depicted in FIG. 2.

There is shown in FIG. 3 an integral multilayer, multicolor photosensitive element 20 positioned in superposed relationship with image-receiving element 8. Between photosensitive element 20 and image-receiving element 8, is shown a frangible container 40 containing a processing composition 42. The multicolor photosensitive element 20 comprises a support 22, bearing in turn a layer 24 containing a cyan dye developer, a layer 26 of a red-sensitive silver halide emulsion, an interlayer 28, a layer 30 containing a magenta dye developer, a layer 32 of a green-sensitive silver halide emulsion, an interlayer 34, a layer 36 of a yellow dye developer, and a layer 38 of a blue-sensitive silver halide emulsion.

While photosensitive element 20 is shown as comprising a plurality of silver halide layers and associated dye developers, photosensitive element 20 can comprise a single silver halide emulsion and associated dye developer to provide a monochromatic image, if desired.

The development of photosensitive element 20 is accomplished by spreading an aqueous alkaline processing composition between the exposed photosensitive element and the superposed image-receiving element. Preferably, the processing composition is confined in a rupturable or frangible container 40, positioned as shown in FIG. 3, between the photosensitive element 20 and the image-receiving element.

Development can be initiated by rupturing container 40, e.g., by means of a pair of pressure rollers (not shown), and spreading its contents 42 in a substantially uniform layer between photosensitive element 20 and the adjacent and superposed image-receiving layer 18 of image-receiving element 10. Photosensitive element 20 can be photoexposed by exposure to light impinging upon layer 38 and image-receiving element 10 can thereafter be brought into a superposed relationship with the photoexposed element 20 in the manner generally shown in FIG. 3. Alternatively, photosensitive element 20 can be photoexposed through support 22 thereof, by providing such support of transparent material. It will be appreciated that, in such instance, the photosensitive emulsion layers and associated dyes will be rearranged in known manner such as to permit photoexposure of the emulsion layers in the sequence shown in FIG. 3, i.e., exposure of the blue-sensitive emulsion first, the green-sensitive emulsion next and the red-sensitive emulsion. Development can be initiated by spreading a suitable processing composition between the photoexposed element and the image-receiving element 8 which will be in a superposed relationship or adapted to be superposed before, during or after photoexposure. Where the exposed film unit is to be processed in the light, suitable opaque layers are provided on each of the outer surfaces, or the film is retained in an opaque envelope as is well known in the art. Image-receiving element 8 may have a removable opaque layer on its outer surface. Whether photosensitive element 20 is photoexposed through its support or from the direction opposed to the support, image-receiving element 8 will be adapted to separation from its superposed relationship to element 20. The desired positive image may then be viewed by separating the image-receiving element 8 from the photosensitive element 30 at the end of the imbibition.

In yet another embodiment, the photosensitive layers may be coated over the image-receiving element and be removed after processing, as described in U.S. Pat. No. 2,983,606, with respect to FIG. 8 thereof.

The processing compositions employed in diffusion transfer processes of the type contemplated herein usually are aqueous alkaline compositions having a pH in excess of about 12, and frequently in the order of 14 or greater. The liquid processing composition permeates the emulsion layer(s) of the photosensitive element to effect development thereof. The liquid processing compositions utilized in the diffusion transfer processes herein comprise at least an aqueous solution of an alkaline material, for example, sodium hydroxide or the like. The processing composition can include known silver halide developing agents as auxiliary developers. Alternatively, such material can suitably be included in the photosensitive element in known manner. Preferably, the processing composition will include a viscosity-increasing compound constituting a film-forming material of the type which, when the composition is spread and dried, forms a relatively firm and relatively stable film. The preferred film-forming materials disclosed comprise high molecular weight polymers such as polymeric, water-soluble ethers which are inert to an alkaline solution such as, for example, a hydroxyethyl cellulose or sodium carboxymethyl cellulose. Additionally, film-forming materials or thickening agents whose ability to increase viscosity is substantially unaffected if left in solution for a long period of time can also be used.

The film-forming material is preferably contained in the processing composition in such suitable quantities as to impart to the composition a viscosity in excess of 100 cps. at a temperature of approximately 24° C., and preferably, in the order of 40,000 cps. to 100,000 cps. at that temperature. As has been set forth herein, the aqueous alkaline processing compositions will preferably be included in a rupturable or frangible container such as container 40 shown in FIG. 3 of the drawing here. Examples of suitable rupturable containers and their methods of manufacture can be found, for example, in U.S. Pat. Nos. 2,543,181; 2,634,886; 3,653,732; 3,056,491 and 3,152,515.

Although the present invention is illustrated primarily by the description of photographic systems utilizing dye developers, other photographic processes for preparing color images can also be employed. For example, photographic processes based upon oxidation and/or coupling reactions to produce desired color images can be employed. Examples of other useful photographic processes are described in U.S. Pat. Nos. 2,559,643; 2,661,293; 2,698,798; 2,802,735; 2,968,554; 2,909,430; 3,015,561; 3,087,817; 2,892,710 and 2,922,105. Also, image dye-providing materials which are initially non-diffusible and which release a diffusible dye or dye intermediate by a coupling or redox reaction can be utilized, as is known in the art and shown, for example, in U.S. Pat. Nos. 3,185,567 and 3,443,939. In general, the photographic processes described in these patents involve an oxidation and/or coupling reaction to provide the desired color image. Another diffusion transfer process utilizing dye release which may be used in the present invention is described in U.S. Pat. No. 3,719,489. Utilizing the present invention in the processes thereof, it will be appreciated that the image-receiving element of the present invention will contain the necessary ingredients, e.g., coupling components, oxidizing agents or the like form the desired color image. These ingredients can be present in image-receiving layer 18 or may be in a separate layer contiguous thereto. Accordingly, the term image-receiving layer, as used herein, includes a layer having the requisite ingredients, e.g., dye mordant, coupling components, oxidizing agents, or the like, suitable, depending upon the particular photographic system employed, for receiving and/or forming a diffusion transfer image.

While the invention has been illustrated by the use of negative-working silver halide emulsions to provide positive transfer images, it will be understood that the invention also contemplates the use of positive-working silver halide emulsions, e.g., internal latent image emulsions, and the formation of either positive or negative transfer images by the selection of the appropriate process, as is well known in the art. Although the invention has been particularly shown and described with reference to preferred embodiments thereof, it will be understood by those skilled in the art that various alterations in form and detail may be made therein without departing from the spirit and scope of the invention. For example, variable density transparencies according to the present invention may readily be prepared using any type of color or black-and-white transparency image. In addition, although a structure having a light polarizer element forming an integral part of the transparency assembly is an arrangement that offers convenient interchangeability between viewing devices, the polarizers also may be mounted in the image transmission path in various other manners to accomplish alteration of the transparency transmission density.

What is claimed is:

1. A diffusion transfer photographic film unit designed for the provision of a transparency image, said diffusion transfer photographic film unit comprising a photosensitive element including at least one photosensitized silver halide emulsion layer having an image-providing material associated therewith, an image-receiving element adapted to be separated from said photosensitive element after transfer image formation, and, a means for introducing an alkaline processing composition within said film unit;

said image-receiving element comprising a transparent sheet material supporting on one surface thereof an image-receiving layer, and including a light polarizer sheet forming an integral part of said image-receiving element; said light polarizer sheet being positioned adjacent the transparent support sheet of said image-receiving element.

2. The film unit of claim 1 wherein said polarizer sheet is a polyvinyl alcohol-iodide complex polarizer.

* * * * *